(12) United States Patent
Maeda et al.

(10) Patent No.: US 11,472,135 B2
(45) Date of Patent: Oct. 18, 2022

(54) METHOD FOR MANUFACTURING HIGH-PRESSURE TANK

(71) Applicant: TOYOTA JIDOSHA KABUSHIKI KAISHA, Toyota (JP)

(72) Inventors: Junya Maeda, Toyota (JP); Koji Katano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 17/076,786

(22) Filed: Oct. 21, 2020

(65) Prior Publication Data

US 2021/0213689 A1 Jul. 15, 2021

(30) Foreign Application Priority Data

Jan. 9, 2020 (JP) .............................. JP2020-001781

(51) Int. Cl.
*B29C 70/30* (2006.01)
*F17C 1/02* (2006.01)
*B29L 31/00* (2006.01)

(52) U.S. Cl.
CPC ................ *B29C 70/30* (2013.01); *F17C 1/02* (2013.01); *B29L 2031/712* (2013.01); *F17C 2201/0109* (2013.01); *F17C 2203/012* (2013.01); *F17C 2203/0604* (2013.01); *F17C 2203/0621* (2013.01); *F17C 2203/0663* (2013.01); *F17C 2205/0305* (2013.01); *F17C 2205/0323* (2013.01); *F17C 2209/2163* (2013.01);

(Continued)

(58) Field of Classification Search
CPC .......... F17C 2221/033; F17C 2221/012; F17C 2209/232; F17C 2209/2163; F17C 2205/0323; F17C 2205/0305; F17C 2203/0663; F17C 2203/0621; F17C 2203/0604; F17C 2203/012; F17C 2201/0109; F17C 1/02; B29L 2031/712; B29C 70/30
See application file for complete search history.

(56) References Cited

U.S. PATENT DOCUMENTS

2017/0136716 A1* 5/2017 Shindo ................... B29C 53/562
2018/0257321 A1* 9/2018 Maekawa ............... B29B 11/16
(Continued)

FOREIGN PATENT DOCUMENTS

| CN | 110662918 A | 1/2020 |
|---|---|---|
| JP | 2017141947 A | 8/2017 |
| JP | 2018149737 A | 9/2018 |

(Continued)

*Primary Examiner* — Vishal I Patel
(74) *Attorney, Agent, or Firm* — Hunton Andrews Kurth LLP (57) ABSTRACT

A method for manufacturing a high-pressure tank including a liner and a reinforcing layer covering an outer surface of the liner includes: forming a cylinder member made of a fiber-reinforced resin; forming a pair of dome members made of the fiber-reinforced resin; and forming a reinforcing body that is the reinforcing layer by joining the cylinder member and the dome members. When forming the cylinder member, a resin-impregnated fiber sheet is wound around an outer peripheral surface of a mandrel to form a cylinder body, and a resin-impregnated fiber bundle is then wound so as to overlap the cylinder body.

5 Claims, 11 Drawing Sheets (52) U.S. Cl.
 CPC .. *F17C 2209/232* (2013.01); *F17C 2221/012* (2013.01); *F17C 2221/033* (2013.01)

(56) References Cited

U.S. PATENT DOCUMENTS

| | | |
|---|---|---|
| 2018/0356037 A1 | 12/2018 | Yokoi et al. |
| 2020/0240586 A1* | 7/2020 | Sonnen ................ B29C 53/602 |

FOREIGN PATENT DOCUMENTS

| | | |
|---|---|---|
| JP | 2018204765 A | 12/2018 |
| JP | 2019019954 A | 2/2019 |

\* cited by examiner

METHOD FOR MANUFACTURING HIGH-PRESSURE TANK

CROSS-REFERENCE TO RELATED APPLICATION

This application claims priority to Japanese Patent Application No. 2020-001781 filed on Jan. 9, 2020, incorporated herein by reference in its entirety.

BACKGROUND

1. Technical Field

The disclosure relates to methods for manufacturing a high-pressure tank including a liner that stores gas and a reinforcing layer made of a fiber-reinforced resin and covering the outer surface of the liner.

2. Description of Related Art

A tank including a tank body and a boss attached to an opening end in the longitudinal direction of the tank body is conventionally known as a high-pressure tank for storing and supplying hydrogen etc. For example, the tank body includes a liner for holding hydrogen gas in an airtight manner and a fiber-reinforced resin layer formed by winding a fiber bundle made of a fiber-reinforced resin around the outer surface of the liner to reinforce the liner.

In a known method for manufacturing a high-pressure tank, a fiber-reinforced resin layer is formed by winding a fiber bundle around the outer surface of a liner by, e.g., filament winding (hereinafter also simply referred to as the "FW process") and curing the fiber bundle.

In another known method for manufacturing a high-pressure tank, a resin-impregnated fiber sheet is wound around the outer surface of a liner in order to reduce the time it takes to form a fiber-reinforced resin layer (e.g., Japanese Unexamined Patent Application Publication No. 2017-141947 (JP 2017-141947 A). In the method for manufacturing a tank described in JP 2017-141947 A, the liner has a smaller diameter in its portion around which the fiber sheet is to be wound than in the remaining portion. With this configuration, steps are less likely to be formed at both ends of a cylindrical section due to the thickness of the cylindrical section when the cylindrical section is formed by winding the fiber sheet around the liner.

SUMMARY

However, in the case where a cylindrical section is formed by winding a fiber sheet around a liner as in JP 2017-141947 A, the end of the winding of the fiber sheet may peel off after the fiber sheet is wound.

The disclosure provides a method for manufacturing a high-pressure tank that restrains an end of winding of a fiber sheet from peeling off One aspect of the disclosure provides a method for manufacturing a high-pressure tank including a liner configured to store gas and a reinforcing layer made of a fiber-reinforced resin and covering an outer surface of the liner. This method includes: forming a cylinder member made of the fiber-reinforced resin; forming a pair of dome members made of the fiber-reinforced resin; and forming a reinforcing body that is the reinforcing layer by joining peripheral edge portions of the cylinder member and peripheral edge portions of the dome members. When forming the cylinder member, a resin-impregnated fiber sheet is wound around an outer peripheral surface of a mandrel to form a cylinder body, and a resin-impregnated fiber bundle is then wound so as to overlap the cylinder body.

According to the method of the disclosure, when forming the cylinder member, the resin-impregnated fiber sheet is wound around the outer peripheral surface of the mandrel to form the cylinder body, and the resin-impregnated fiber bundle is then wound so as to overlap the cylinder body. Accordingly, an outer peripheral surface of the cylinder body (fiber sheet) is held by the fiber bundle. The end of the winding of the fiber sheet is thus restrained from peeling off.

In the above method, when forming the cylinder member, after the cylinder body is formed, the peripheral edge portions that overlap ends in an axial direction of the cylinder body may be formed by winding the fiber bundle around the outer peripheral surface of the mandrel in such a manner that the fiber bundle adjoins the both ends of the cylinder body. When the end of the winding of the fiber sheet peels off, edges of the fiber sheet (the ends in the axial direction of the cylinder body) tend to peel off first. Since the fiber bundle overlaps the edges of the fiber sheet, the end of the winding of the fiber sheet is effectively restrained from peeling off. Even in the case where the fiber bundle is wound so as to adjoin the both ends in the axial direction of the cylinder body after forming the cylinder body, the fiber bundle is wound so as to overlap the ends of the cylinder body. The fiber body is thus wound so as to be in close contact with the cylinder body. Voids are therefore less likely to be formed between the peripheral edge portions (fiber bundle) and the cylinder body. Moreover, since the peripheral edge portions of the cylinder member are made of the fiber bundle, the peripheral edge portions of the cylinder member may be formed so as to conform to the peripheral edge portions of the dome members.

In the above method, when winding the fiber bundle in such a manner that the fiber bundle adjoins the both ends in the axial direction of the cylinder body, the fiber bundle may be wound in such a manner that the cylinder member gradually becomes thinner as the cylinder ember extends away from the ends of the cylinder body. When joining the cylinder member and the dome members, the peripheral edge portions of the cylinder member may be inserted and fitted in the peripheral edge portions of the dome members, or the peripheral edge portions of the dome members may be inserted and fitted in the peripheral edge portions of the cylinder member. Since the fiber bundle is wound in such a manner that the cylinder member gradually becomes thinner as the cylinder member extends away from the ends of the cylinder body, steps are less likely to be formed in connection portions between an outer surface of the cylinder member and outer surfaces of the dome members when the cylinder member and the dome members are joined.

Accordingly, voids are less likely to be formed between the outer reinforcing layer and the reinforcing body (the cylinder member and the dome members) due to the steps in the connection portions between the cylinder member and the dome members when the outer reinforcing layer such as a helical layer is formed so as to cover the cylinder member and the dome members. Reduction in strength of the high-pressure tank due to the voids is thus restrained.

In the above method, when forming the cylinder member, after the cylinder body is formed, the fiber bundle may be wound from one end of the cylinder body to the other end of the cylinder body so as to overlap the cylinder body. With this configuration, the outer peripheral surface of the cylinder body (fiber sheet) is held by the fiber bundle along the entire length in the axial direction of the cylinder body. The end of the winding of the fiber sheet is thus reliably restrained from peeling off.

In the above method, when forming the cylinder member, after the cylinder body is formed, the peripheral edge portion on one side may be formed by winding the fiber bundle around the outer peripheral surface of the mandrel in such a manner that the fiber bundle adjoins one end of the cylinder body, the fiber bundle may be wound from the one end to the other end of the cylinder body so as to overlap the cylinder body, and the peripheral edge portion on the other side may be formed by winding the fiber bundle around the outer peripheral surface of the mandrel in such a manner that the fiber bundle adjoins the other end of the cylinder body. With this configuration, the outer peripheral surface of the cylinder body (fiber sheet) is held by the fiber bundle across the both ends in the axial direction of the cylinder body. The end of the winding of the fiber sheet is thus reliably restrained from peeling off. Moreover, since the fiber bundle can be continuously wound from a region on one side to a region on the other side of the cylinder body, the number of feed rollers for supplying the fiber bundle can be reduced as compared to the case where separate fiber bundles are wound around the region on the one side of the cylinder body and the region on the other side of the cylinder body.

The disclosure thus provides a method for manufacturing a high-pressure tank that restrains an end of winding of a fiber sheet from peeling off.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Before describing a method for manufacturing a high-pressure tank 10 according to a first embodiment of the disclosure, the configuration of the high-pressure tank 10 will be briefly described with reference to the drawings. Although the high-pressure tank 10 is herein described as a tank that is mounted on a fuel cell vehicle and that is filled with high-pressure hydrogen gas, the high-pressure tank 10 can also be used in other applications. The gas that can be used for the high-pressure tank 10 is not limited to high-pressure hydrogen gas.

Figure 1:
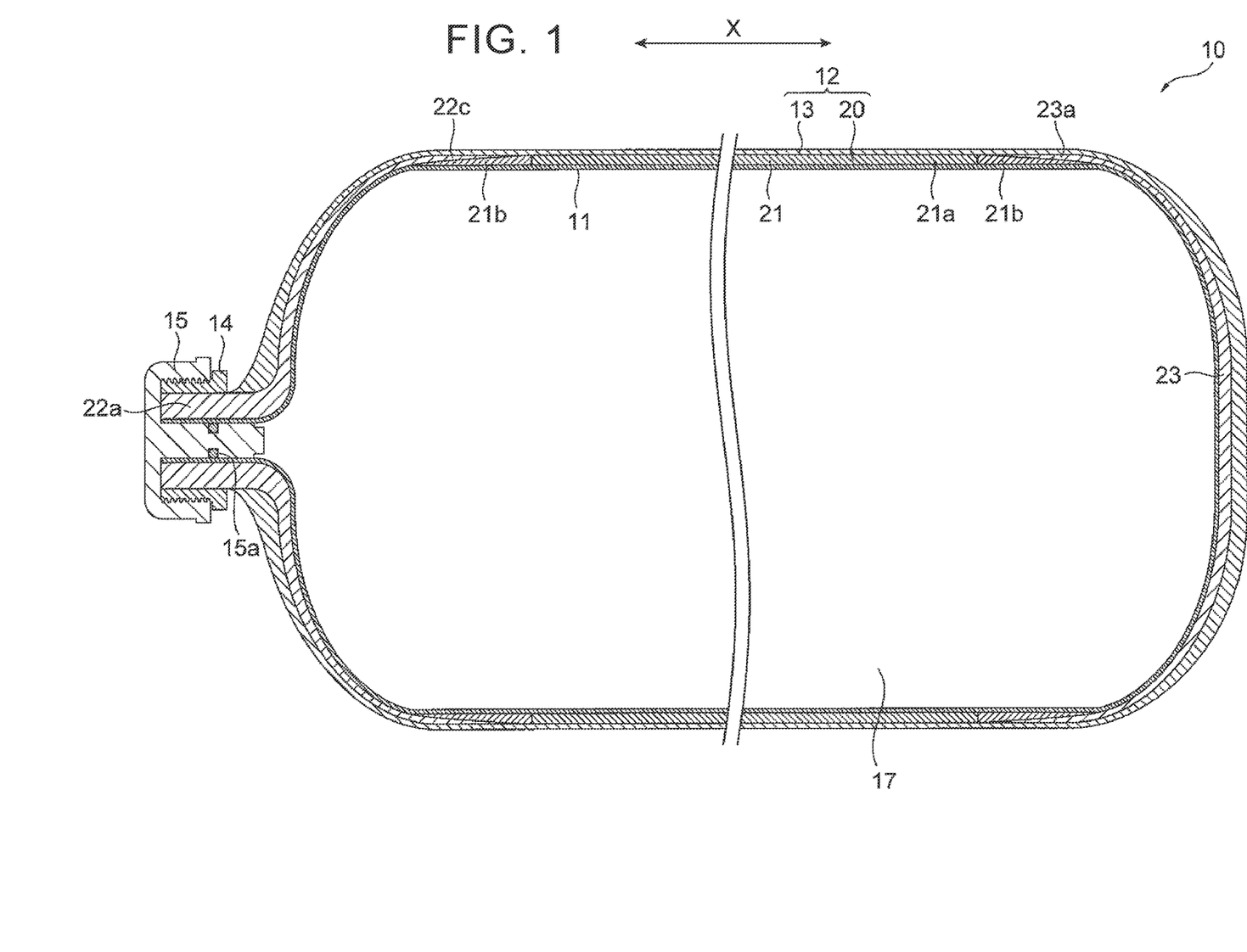
FIG. 1 is a sectional view illustrating the structure of a high-pressure tank that is manufactured by a method according to a first embodiment of the disclosure.
Figure 2:
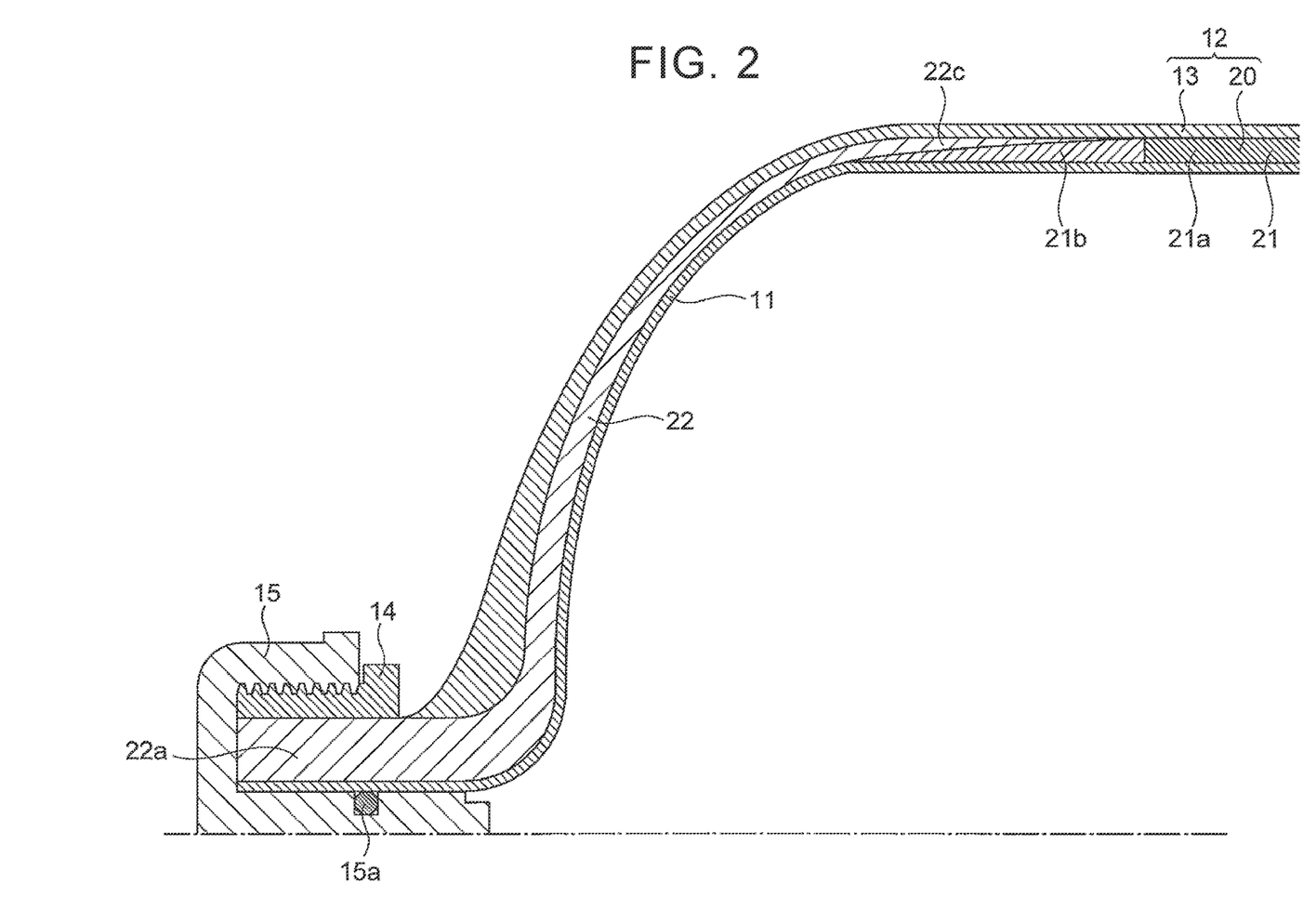
FIG. 2 is a partial sectional view illustrating the structure of the high-pressure tank that is manufactured by the method according to the first embodiment of the disclosure.

As shown in FIGS. 1 and 2, the high-pressure tank 10 is a generally cylindrical high-pressure gas storage container with both ends rounded in a dome shape. The high-pressure tank 10 includes a liner 11 having gas barrier properties and a fiber-reinforced resin layer 12 made of a fiber-reinforced resin and covering the outer surface of the liner 11. The fiber-reinforced resin layer 12 has a reinforcing body 20 and an outer reinforcing layer 13. The reinforcing body 20 is a reinforcing layer and covers the outer surface of the liner 11, and the outer reinforcing layer 13 covers the outer surface of the reinforcing body 20. The high-pressure tank 10 has an opening in its one end and has a boss 14 attached around the opening. The high-pressure tank 10 has no opening in the other end and has no boss attached to the other end.

The liner 11 extends along the inner surface of the reinforcing body 20. The liner 11 is a resin member forming a storage space 17 that is filled with high-pressure hydrogen gas. The resin for the liner 11 is preferably a resin capable of holding filling gas (in this example, hydrogen gas) in the storage space 17, namely a resin having satisfactory gas barrier properties. Examples of such a resin include thermoplastic resins such as polyamide, polyethylene, ethylene-vinyl alcohol copolymer resin (EVOH), and polyester and thermosetting resins such as epoxy resin. Instead of hydrogen gas, the liner 11 may be filled with other fuel gases. Examples of the fuel gases include compressed gases such as compressed natural gas (CNG) and various liquefied gases such as liquefied natural gas (LNG) and liquefied petroleum gas (LPG).

The boss 14 is formed by machining a metal material such as aluminum or aluminum alloy into a predetermined shape. A valve 15 that controls the flow of hydrogen gas into and out of the storage space 17 is attached to the boss 14. The valve 15 is provided with a seal member 15a. The seal member 15a contacts the inner surface of the liner 11 in a protruding portion 22a of a dome member 22 described later and seals the storage space 17 of the high-pressure tank 10.

The reinforcing body 20 covers the outer surface of the liner 11 and functions to reinforce the liner 11 to improve mechanical strength, such as rigidity and pressure resistance, of the high-pressure tank 10. As will be described later, the reinforcing body 20 has a cylindrical cylinder member 21 and a pair of dome members 22, 23 connected to both ends of the cylinder member 21. The reinforcing body 20 is a member formed by joining the cylinder member 21 and the dome members 22, 23. In the present embodiment, the cylinder member 21 is composed of a cylindrical cylinder body 21a and peripheral edge portions 21b that contact both ends of the cylinder body 21a.

The reinforcing body 20 is made of resin and fibers (continuous fibers). In the cylinder member 21, the fibers extend along the circumference of the cylinder member 21 at an angle substantially perpendicular to the axial direction X of the reinforcing body 20. In other words, the fibers in the cylinder member 21 are oriented in the circumferential direction of the cylinder member 21. The fibers are wound at least once around the outer surface of the liner 11. In the dome members 22, 23, on the other hand, the fibers are not oriented in the circumferential direction of the cylinder member 21 but the fibers extending in various directions crossing the circumferential direction are placed on top of one another.

The outer reinforcing layer 13 covers the outer surface of the reinforcing body 20. The outer reinforcing layer 13 is made of resin and fibers (continuous fibers). In the outer reinforcing layer 13, the fibers are oriented parallel to, or obliquely at 45 degrees or less with respect to, the axial direction X of the cylinder member 21 and extend over the cylinder member 21 and across the dome members 22, 23 located at both ends of the cylinder member 21. These fibers prevent the dome members 22, 23 from moving outward in the axial direction X and thus prevent the dome members 22, 23 from coming off from the cylinder member 21 outward in the axial direction X by the gas pressure.

Figure 3:
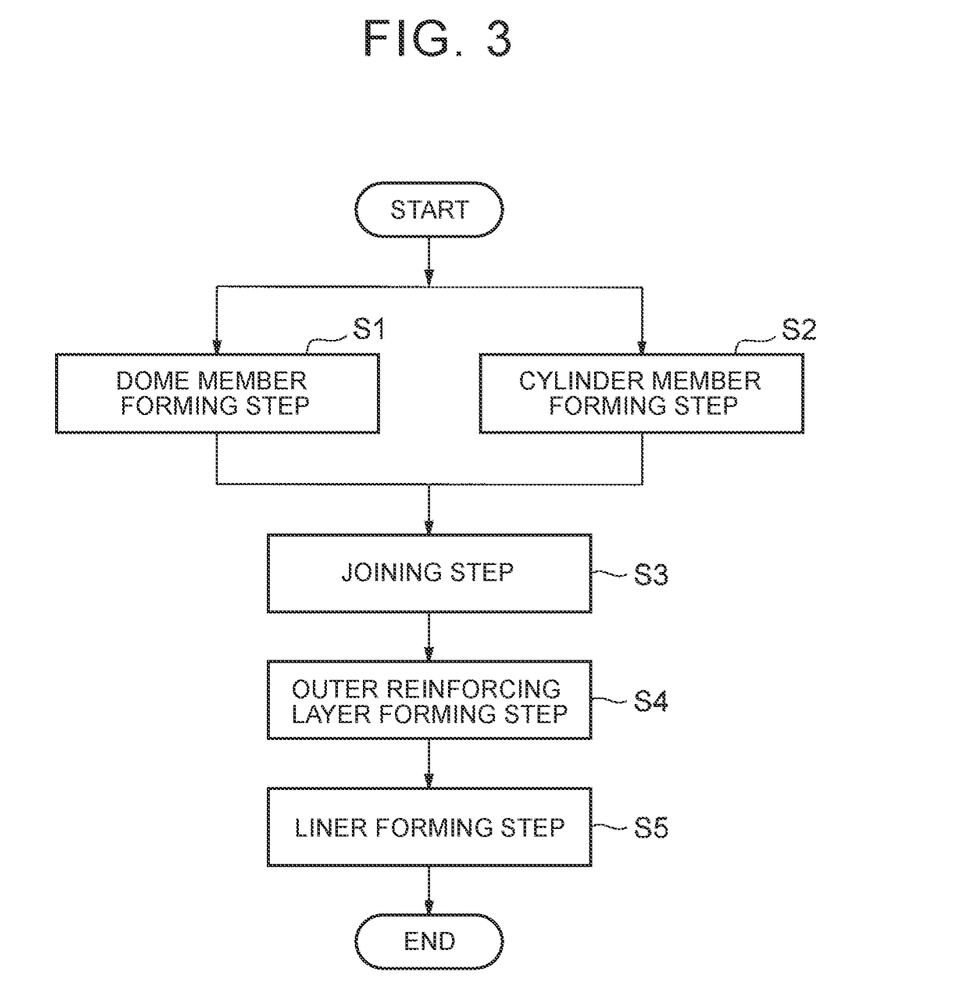
FIG. 3 is a flowchart of the method for manufacturing a high-pressure tank according to the first embodiment of the disclosure.

Next, a method for manufacturing the high-pressure tank 10 according to the first embodiment of the disclosure will be described. FIG. 3 is a flowchart of the method for manufacturing the high-pressure tank 10. As shown in FIG. 3, the method for manufacturing the high-pressure tank 10 includes a dome member forming step S1, a cylinder member forming step S2, a joining step S3, an outer reinforcing layer forming step S4, and a liner forming step S5. Since the dome member forming step S1 and the cylinder member forming step S2 are independent of each other, the steps S1, S2 may be performed either in parallel or sequentially in either order.

In the dome member forming step S1, the dome members 22, 23 made of a fiber-reinforced resin are formed. For example, the dome members 22, 23 can be formed by attaching (or winding) a resin-impregnated fiber bundle around a die with a dome-shaped surface and curing the fiber bundle or by injection molding. At this time, the cylindrical protruding portion 22a with a through hole 22b is formed in the dome member 22. The boss 14 is attached to the outer surface of the protruding portion 22a of the dome member 22.

The resin with which the fiber bundle is impregnated is not particularly limited, but is, e.g., a thermosetting resin. Preferred examples of the thermosetting resin include a phenol resin, a melamine resin, a urea resin, and an epoxy resin, and an epoxy resin is particularly preferable in terms of mechanical strength etc. Epoxy resins are typically resins produced by mixing a prepolymer such as a copolymer of bisphenol A and epichlorohydrin and a curing agent such as a polyamine and thermally curing the mixture. Epoxy resins are fluid when uncured and form a strong crosslinked structure when thermally cured. The resin with which the fiber bundle is impregnated may be a thermoplastic resin. Examples of the thermoplastic resin include polyether ether ketone, polyphenylene sulfide, polyacrylic acid ester, polyimide, and polyamide.

Examples of fibers of the fiber bundle include glass fibers, aramid fibers, boron fibers, and carbon fibers. Carbon fibers are particularly preferable in terms of lightweightness, mechanical strength, etc.

Figure 4:
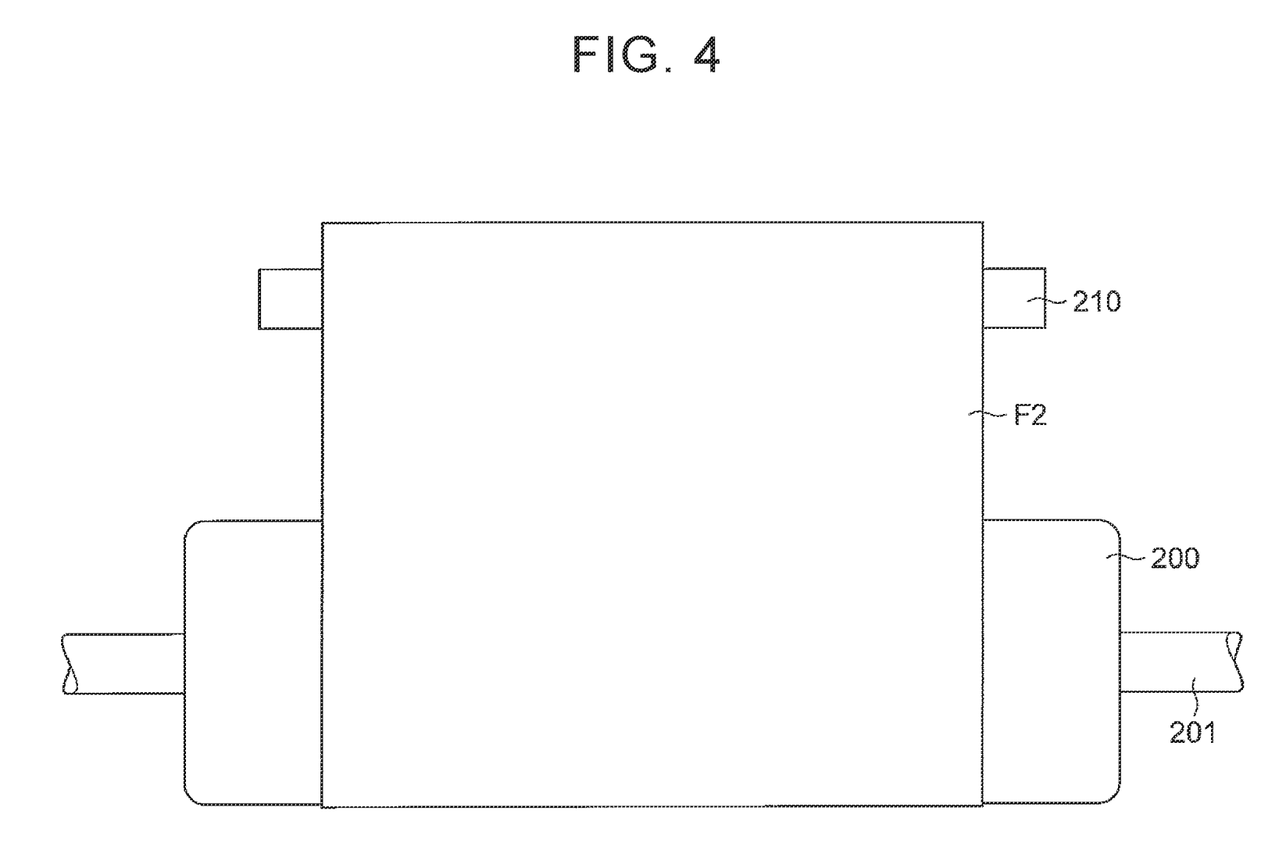
FIG. 4 illustrates a cylinder member forming step of the method for manufacturing a high-pressure tank according to the first embodiment of the disclosure.
Figure 5:
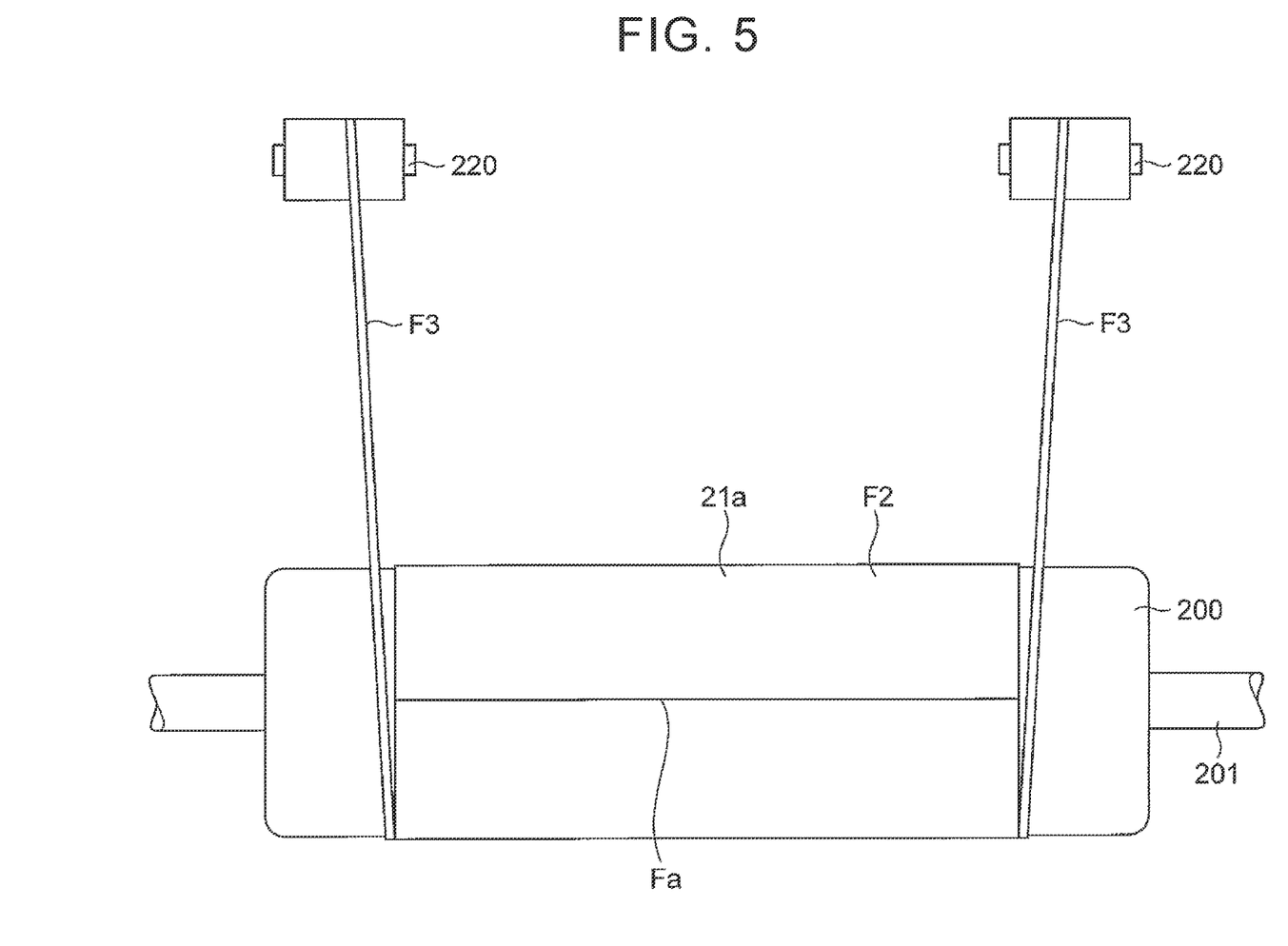
FIG. 5 illustrates the cylinder member forming step of the method for manufacturing a high-pressure tank according to the first embodiment of the disclosure.

In the cylinder member forming step S2, as shown in FIGS. 4 and 5, the cylinder member 21 is formed using both what is called sheet winding and filament winding. In the sheet winding, a fiber sheet F2 is wound around the outer peripheral surface of a rotating solid or hollow cylindrical mandrel 200. In the filament winding, a fiber bundle F3 is wound around the outer peripheral surface of the mandrel 200.

Specifically, the mandrel 200 has a shaft 201, and the shaft 201 is rotated at a predetermined rotational speed by a shaft drive mechanism (not shown). The material of the mandrel 200 is not particularly limited, but is preferably metal in order for the mandrel 200 to be strong enough not to deform when the fiber sheet F2 is attached to the mandrel 200.

A sheet feeder and a fiber bundle feeder are disposed so as to face the outer peripheral surface of the mandrel 200. The sheet feeder includes a feed roller 210 (see FIG. 4) that supplies the fiber sheet F2 to the mandrel 200. The fiber bundle feeder includes feed rollers 220 (see FIG. 5) that supply the fiber bundle F3 to the mandrel 200. The feed roller 210 is rotatable at a predetermined rotational speed. The feed rollers 220 are rotatable at a predetermined rotational speed and movable in the axial direction of the shaft 201. In the present embodiment, the two feed rollers 220 are disposed so as to face both ends of the mandrel 200. As described later, in the present embodiment, the fiber bundle F3 is wound using the feed rollers 220 after winding the fiber sheet F2 using the feed roller 210.

The fiber sheet F2 has at least fibers oriented in the circumferential direction of the feed roller 210, and the fiber bundle F3 is formed by fibers oriented in the circumferential direction of the feed roller 220. The cylinder member 21 having fibers oriented in the circumferential direction can thus be produced.

Examples of the fiber sheet F2 include a uni-direction (UD) sheet formed by interlacing a plurality of fiber bundles aligned in a single direction with restraining yarn, and a fiber sheet formed by interlacing a plurality of fiber bundles aligned in a single direction with a plurality of fiber bundles crossing these fiber bundles, e.g., oriented perpendicularly to these fiber bundles. The fiber sheet F2 is impregnated with resin in advance. The fiber bundle F3 is also impregnated with resin in advance.

The resin with which the fiber sheet F2 and the fiber bundle F3 are impregnated is not particularly limited, but is, e.g., a thermosetting resin. Like the fiber bundle for the dome members 22, 23, preferred examples of the thermosetting resin include a phenol resin, a melamine resin, a urea resin, and an epoxy resin, and an epoxy resin is particularly preferable in terms of mechanical strength etc.

Like the fiber bundle for the dome members 22, 23, examples of the fibers of the fiber sheet F2 and the fiber bundle F3 include glass fibers, aramid fibers, boron fibers, and carbon fibers, and carbon fibers are particularly preferable in terms of lightweightness, mechanical strength, etc.

As shown in FIG. 4, the fiber sheet F2 is fed from the feed roller 210 while rotating the mandrel 200. The fiber sheet F2 is thus wound around a predetermined region of the mandrel 200. Once a predetermined amount of fiber sheet F2 is wound around the mandrel 200, the fiber sheet F2 is cut at a predetermined position. The cylinder body 21a made of the fiber sheet F2 is formed in this manner.

Next, as shown in FIG. 5, the fiber bundle F3 is fed from the two feed rollers 220 while rotating the mandrel 200. The fiber bundle F3 is thus wound around two regions of the outer peripheral surface of the mandrel 200, namely a region adjacent to one end of the cylinder body 21a and a region adjacent to the other end of the cylinder body 21a. During winding, the feed rollers 220 are moved in the axial direction of the mandrel 200 so that the fiber bundle F3 is wound in a predetermined shape in the region on one side of the cylinder body 21a and the region on the other side of the cylinder body 21a. The peripheral edge portions 21b are formed in this manner. Specifically, the fiber bundle F3 is wound so that the cylinder member 21 gradually becomes thinner as it extends away from the ends of the cylinder body 21a. The outer peripheral surface of the cylinder body 21a (fiber sheet F2) and the outer peripheral surface of the mandrel 200 are thus connected via the tilted surfaces formed by the fiber bundle F3. The peripheral edge portions 21b of the cylinder member 21 are formed so that the outer peripheral surfaces of the peripheral edge portions 21b conform to the inner surface of a peripheral edge portion 22c of the dome member 22 and the inner surface of a peripheral edge portion 23a of the dome member 23. The cylinder member 21 is therefore less likely to come off from the dome members 22, 23.

Figure 6:
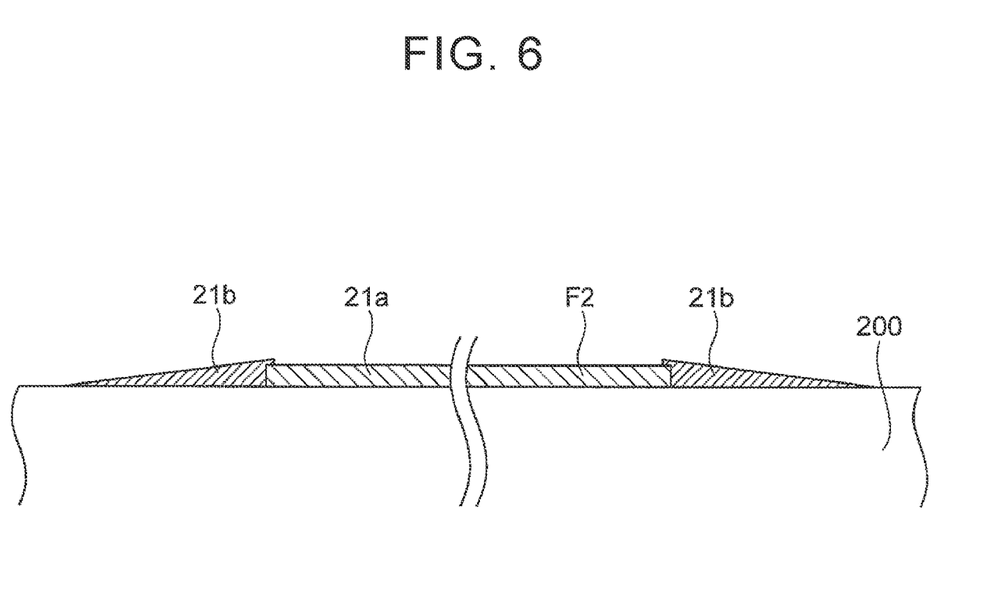
FIG. 6 is a sectional view illustrating the structure of peripheral edge portions of a cylinder member.

When forming the peripheral edge portions 21b, the fiber bundle F3 is wound so as to closely contact the cylinder body 21a (fiber sheet F2) and is also wound at least once around the edges on one side and the other side of the cylinder body 21a (fiber sheet F2) so as to overlap these edges of the cylinder body 21a (fiber sheet F2) (see FIG. 6). The edges on the one side and the other side of the cylinder body 21a (fiber sheet F2) are thus held by the fiber bundle F3. This restrains the fiber sheet F2 from peeling off.

Once the peripheral edge portions 21b are formed on both sides in the axial direction of the cylinder body 21a, the fiber bundle F3 is cut at a predetermined position, and the winding of the fiber bundle F3 around the mandrel 200 is completed. The cylinder member 21 (the cylinder body 21a and the peripheral edge portions 21b) is then cured and removed from the mandrel 200. The cylinder member forming step S2 is thus completed.

As described above, in the cylinder member forming step S2, the resin-impregnated fiber sheet F2 is wound around the outer peripheral surface of the mandrel 200, and the resin-impregnated fiber bundle F3 is then wound so as to overlap the cylinder body 21a. The outer peripheral surface of the cylinder body 21a (fiber sheet F2) is thus held by the fiber bundle F3, and an end Fa of the winding of the fiber sheet F2 is restrained from peeling off. When the end Fa of the winding of the fiber sheet F2 peels off, the edges of the fiber sheet F2 (the ends in the axial direction X of the cylinder body 21a) tend to peel off first. Since the fiber bundle F3 overlaps the edges of the fiber sheet F2, the end Fa of the winding of the fiber sheet F2 is effectively restrained from peeling off.

As described above, the cylinder member 21 is formed so that its both ends in the axial direction gradually become thinner. As shown in FIG. 1, steps are therefore less likely to be formed in the connection portions between the outer surface of the cylinder member 21 (the outer peripheral surface of the cylindrical body 21a) and the outer surfaces of the dome members 22, 23 when the cylinder member 21 is inserted and fitted in the dome members 22, 23, as described below. Accordingly, voids are less likely to be formed between the outer reinforcing layer 13 and the reinforcing body 20 (the cylinder member 21 and the dome members 22, 23) due to the steps in the connection portions between the cylinder member 21 and the dome members 22, 23 when the outer reinforcing layer 13 such as a helical layer is formed so as to cover the cylinder member 21 and the dome members 22, 23, as described later. Reduction in strength of the high-pressure tank 10 due to the voids is thus restrained.

As described above, the cylinder member 21 is formed using the mandrel 200. In other words, the cylinder member 21 is formed without directly winding the fiber bundle etc. around the liner 11. Since the liner 11 is not subjected to a tightening force that is caused by sheet winding, it is not necessary to increase the strength of the liner 11 so that the liner 11 is not deformed by the tightening force. It is therefore possible to reduce the thickness (wall thickness) of the liner 11. Accordingly, the capacity of the liner 11 can be increased and the weight of the liner 11 can be reduced.

In the above example, the fiber bundle F3 is simultaneously wound using the two feed rollers 220. However, for example, only one feed roller 220 may be used, and the peripheral edge portions 21b may be separately formed on both sides in the axial direction of the cylinder body 21a using this feed roller 220. In the above example, the peripheral edge portions 21b are formed so as to have a tilted outer surface. However, the peripheral edge portions 21b may be formed so as to have a stepped outer surface. More specifically, the peripheral edge portions 21b may be formed so that the cylinder member 21 becomes thinner stepwise as it extends away from the ends of the cylinder body 21a.

Figure 7:
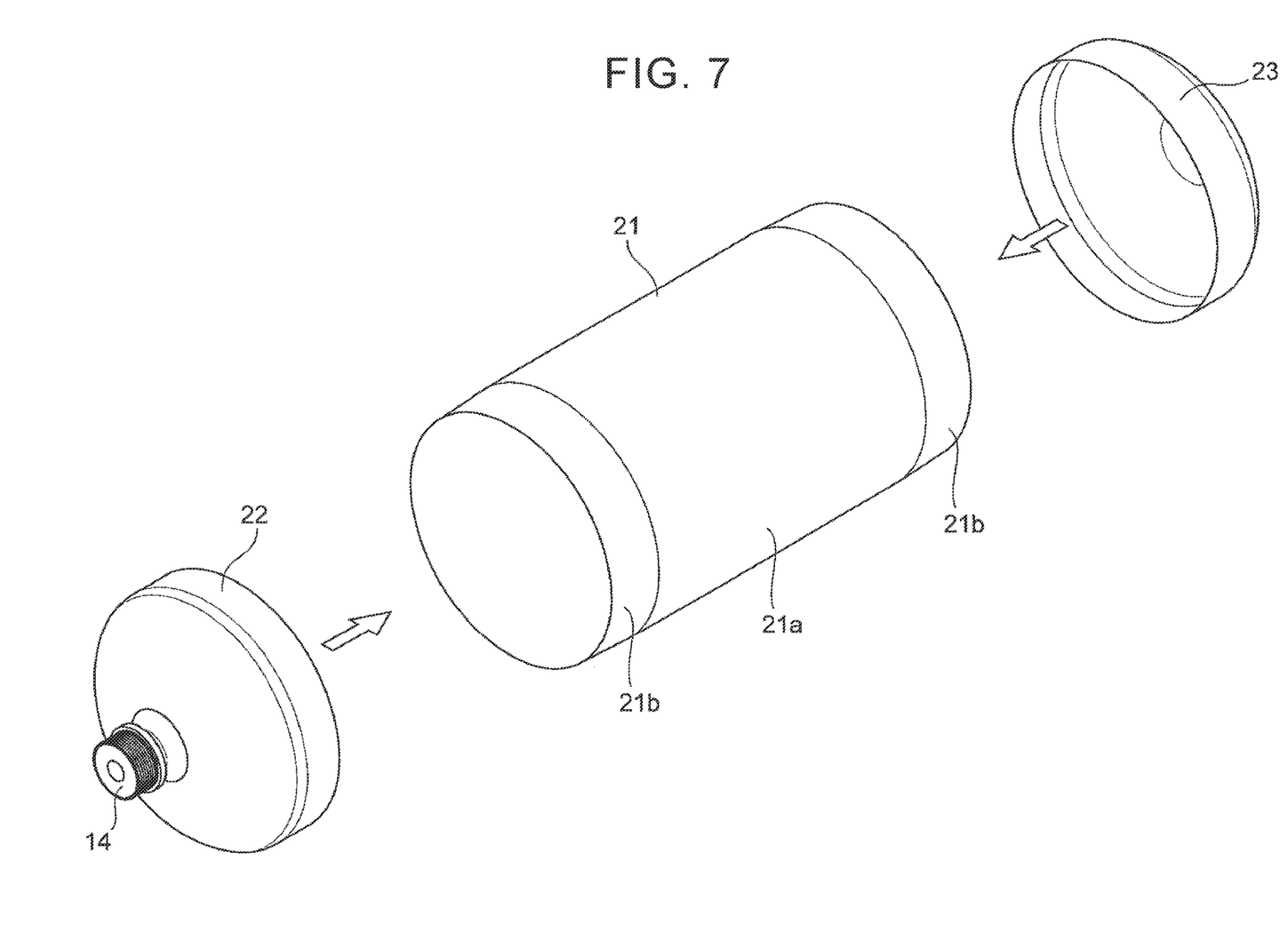
FIG. 7 is a perspective view illustrating a joining step of the method for manufacturing a high-pressure tank according to the first embodiment of the disclosure.

In the joining step S3, as shown in FIG. 7, the peripheral edge portions 21b at both ends of the cylinder member 21 and the peripheral edge portions 22c, 23a of the dome members 22, 23 (see FIG. 1) are joined to form the reinforcing body 20 that is a reinforcing layer.

Specifically, either the peripheral edge portions 21b of the cylinder member 21 or the peripheral edge portions 22c, 23a of the dome members 22, 23 (in this example, the peripheral edge portions 21b) are inserted and fitted in the other (in this example, the peripheral edge portions 22c, 23a). At this time, an adhesive (not shown) may be applied between the cylinder member 21 and the dome members 22, 23. This configuration further restrains the dome members 22, 23 from coming off from the cylinder member 21 in a later step. Moreover, since the adhesive fills the gaps between the cylinder member 21 and the dome members 22, 23, a resin material for the liner 11 is prevented from flowing into the gaps between the cylinder member 21 and the dome members 22, 23 in the liner forming step S5. The material of the adhesive is not particularly limited, but is preferably, e.g., a thermosetting resin such as epoxy resin.

In the outer reinforcing layer forming step S4, the outer reinforcing layer 13 made of a fiber-reinforced resin and having fibers placed across the dome members 22, 23 is formed so as to cover the outer surface of the reinforcing body 20. The fiber-reinforced resin layer 12 having the reinforcing body 20 and the outer reinforcing layer 13 is formed in this manner. For example, the outer reinforcing layer 13 may be formed by helically winding a plurality of resin-impregnated fiber bundles around the outer surface of the reinforcing body 20. Alternatively, the outer reinforcing layer 13 may be formed by attaching a plurality of resin-impregnated fiber bundles to the outer surface of the reinforcing body 20 such that the resin-impregnated fiber bundles extend in the axial direction X of the reinforcing body 20. The outer reinforcing layer 13 may be formed by winding a resin-impregnated fiber sheet around the outer surface of the reinforcing body 20 by sheet winding.

The resin with which the fiber bundles are impregnated is not particularly limited, but is, e.g., a thermosetting resin. Like the fiber bundle for the dome members 22, 23, preferred examples of the thermosetting resin include a phenol resin, a melamine resin, a urea resin, and an epoxy resin, and an epoxy resin is particularly preferable in terms of mechanical strength etc.

Like the fiber bundle for the dome members 22, 23, examples of the fibers of the fiber bundles include glass fibers, aramid fibers, boron fibers, and carbon fibers, and carbon fibers are particularly preferable in terms of lightweightness, mechanical strength, etc.

As described above, the outer reinforcing layer 13 has fibers placed across the dome members 22, 23. The fibers of the outer reinforcing layer 13 therefore prevent the dome members 22, 23 from being separated from the cylinder member 21. The dome members 22, 23 are thus restrained from coming off from both ends of the cylinder member 21 by the gas pressure.

Figure 8:
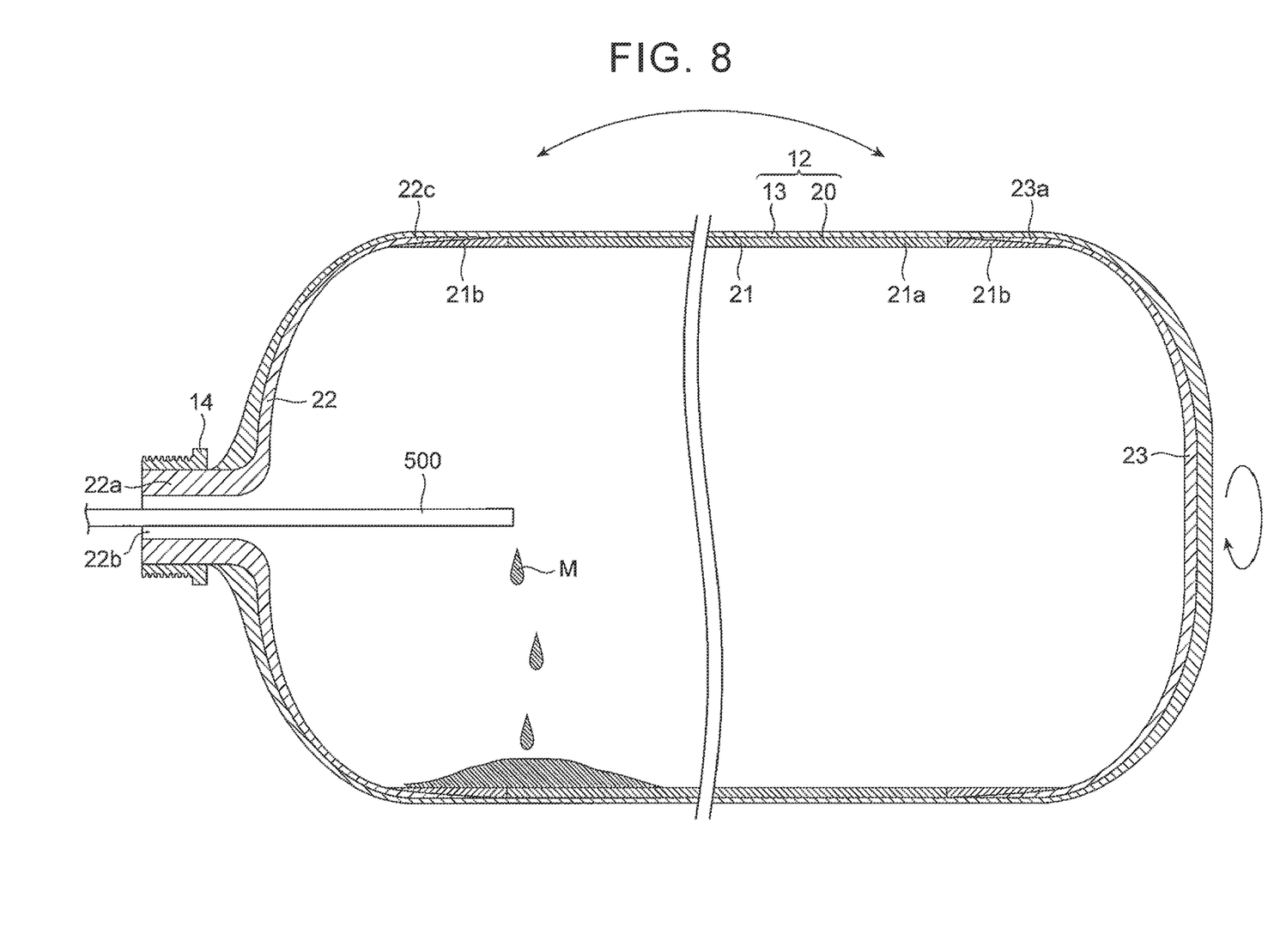
FIG. 8 is a sectional view illustrating a liner forming step of the method for manufacturing a high-pressure tank according to the first embodiment of the disclosure.

In the liner forming step S5, as shown in FIG. 8, a resin material M is introduced into the fiber-reinforced resin layer 12 through the through hole 22b in the protruding portion 22a of the reinforcing body 20. The resin material M is then solidified while rotating the fiber-reinforced resin layer 12. The liner 11 is formed in this manner.

Specifically, the internal space of the fiber-reinforced resin layer 12 communicates with the space outside the fiber-reinforced resin layer 12 through the through hole 22b. A nozzle 500 that discharges the resin material M is inserted through the through hole 22b, and the resin material M is introduced into the internal space of the fiber-reinforced resin layer 12 through the nozzle 500. The nozzle 500 is then removed from the through hole 22b.

As described above, the resin material M is preferably a resin having satisfactory gas barrier properties. Examples of such a resin include thermoplastic resins such as polyamide, polyethylene, ethylene-vinyl alcohol copolymer resin (EVOH), and polyester and thermosetting resins such as epoxy resin, and polyamide is preferred.

Thereafter, the internal space of the fiber-reinforced resin layer 12 is heated to a predetermined temperature or higher as necessary. With the resin material having low viscosity and being fluid, the fiber-reinforced resin layer 12 is rotated in the circumferential direction about its axis extending in the horizontal direction, while moving both ends of the fiber-reinforced resin layer 12 alternately up and down (see FIG. 8). As the fiber-reinforced resin layer 12 is rotated, the inner surface of the fiber-reinforced resin layer 12 moves upward with the fluid resin material M thereon, and a part of the resin material M flows down the inner surface of the fiber-reinforced resin layer 12 due to its own weight. The resin material M thus covers the entire inner surface of the reinforcing body 20. In the case where the resin material M is a thermosetting resin, the internal space of the fiber-reinforced resin layer 12 is heated to cure the resin material M. The liner 11 is thus formed. In the case where the resin material M is a thermoplastic resin, the internal space of the fiber-reinforced resin layer 12 is cooled to solidify the resin material M that is in contact with and covers the inner surface of the fiber-reinforced resin layer 12. The liner 11 is thus formed. In this example, the liner 11 is formed by reaction injection molding using two or more kinds of low molecular weight, low viscosity liquid materials that are fluid at normal temperature as the resin material M. In this case, the internal space of the fiber-reinforced resin layer 12 is heated to produce a polymer from a monomer. The internal space of the fiber-reinforced resin layer 12 is then cooled to solidify the polymer. The liner 11 is thus formed.

According to the liner forming step S5, the liner 11 can be easily formed inside the fiber-reinforced resin layer 12 even after the fiber-reinforced resin layer 12 is formed. Moreover, no mold for molding the liner is necessary unlike the case where the liner is formed by injection molding using resin.

The high-pressure tank 10 is completed by attaching the valve 15 to the boss 14.

As described above, in the cylinder member forming step S2 of the present embodiment, the resin-impregnated fiber sheet F2 is wound around the outer peripheral surface of the mandrel 200, and the resin-impregnated fiber bundle F3 is then wounded so as to overlap the cylinder body 21a. The outer peripheral surface of the cylinder body 21a (fiber sheet F2) is thus held by the fiber bundle F3, and the end Fa of the winding of the fiber sheet F2 is restrained from peeling off. When the end Fa of the winding of the fiber sheet F2 peels off, the edges of the fiber sheet F2 (the ends in the axial direction X of the cylinder body 21a) tend to peel off first. Since the fiber bundle F3 overlaps the edges of the fiber sheet F2, the end Fa of the winding of the fiber sheet F2 is effectively restrained from peeling off.

Figure 9:
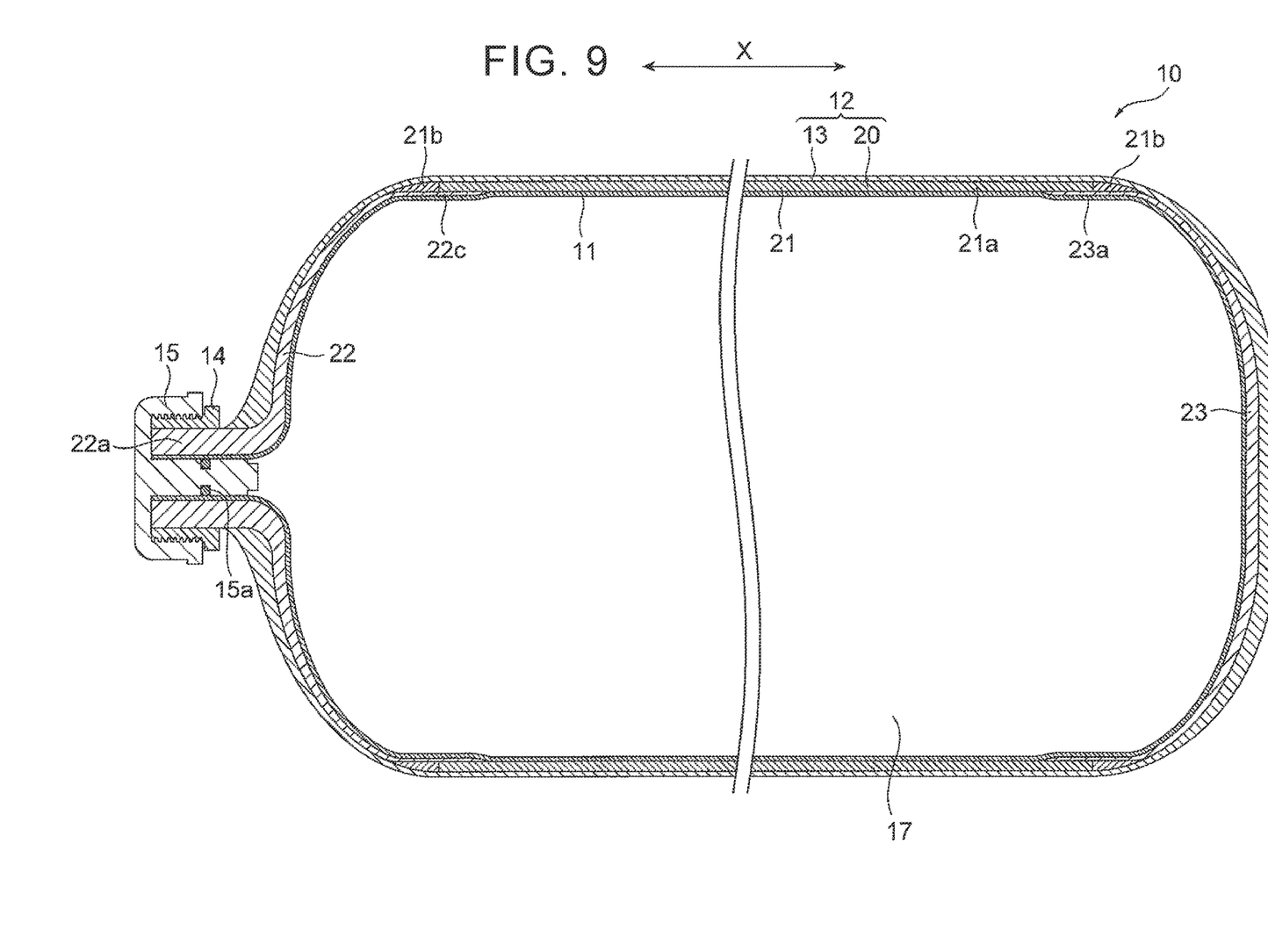
FIG. 9 is a sectional view illustrating the structure of a high-pressure tank that is manufactured by a method according to a modification of the disclosure.

In the example described in the present embodiment, the cylinder member 21 is inserted and fitted in the dome members 22, 23. However, for example, as in a modification shown in FIG. 9, the dome members 22, 23 may be inserted in the cylinder member 21 so that the peripheral edge portions 22c, 23a of the dome members 22, 23 are fitted in the peripheral edge portions 21b of the cylinder member 21. In this case as well, steps are less likely to be formed in the connection portions between the outer surface of the cylinder member 21 (the outer surface of the cylindrical body 21a) and the outer surfaces of the dome members 22, 23. Accordingly, voids are less likely to be formed between the outer reinforcing layer 13 and the reinforcing body 20 due to the steps in the connection portions between the cylinder member 21 and the dome members 22, 23 when the outer reinforcing layer 13 is formed so as to cover the cylinder member 21 and the dome members 22, 23. Reduction in strength of the high-pressure tank 10 due to the voids is thus restrained.

Second Embodiment

A second embodiment will be described with respect to an example in which, unlike the first embodiment, the fiber bundle F3 is wound around the outer peripheral surface of the cylinder body 21a (fiber sheet F2) in the cylinder member forming step S2. In the present embodiment, the cylinder member 21 is formed by the cylindrical cylinder body 21a, and both ends in the axial direction of the cylinder body 21a are the peripheral edge portions of the cylinder member 21.

Figure 10:
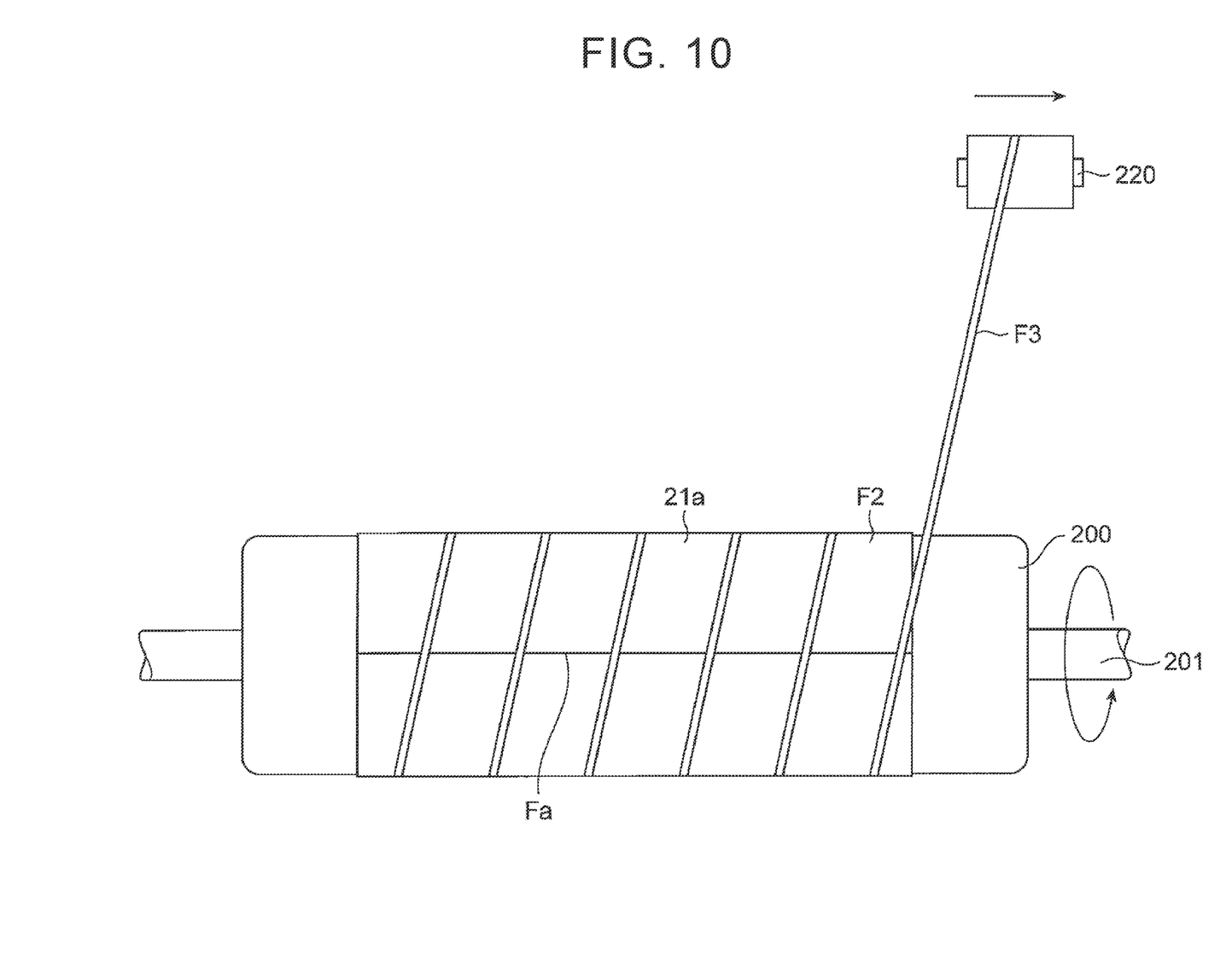
FIG. 10 illustrates a cylinder member forming step of a method for manufacturing a high-pressure tank according to a second embodiment of the disclosure.

In the second embodiment, as shown in FIG. 10, one feed roller 220 is disposed so as to face the outer peripheral surface of the mandrel 200.

In the cylinder member forming step S2, the fiber sheet F2 is first wound around a predetermined region of the mandrel 200 as in the first embodiment. The cylinder body 21a made of the fiber sheet F2 is thus formed.

Next, as shown in FIG. 10, the fiber bundle F3 is fed from the feed roller 220 while rotating the mandrel 200. The fiber bundle F3 is thus wound around the outer peripheral surface the cylinder body 21a (fiber sheet F2). The feed roller 220 is moved in the axial direction of the shaft 201 while feeding the fiber bundle F3. The fiber bundle F3 is thus wound from one end to the other end of the cylinder body 21a (fiber sheet F2). At this time, the fiber bundle F3 is wound at a predetermined pitch in the axial direction (such that the fiber sheet F2 is exposed).

Once the fiber bundle F3 is wound from one end to the other end of the cylinder body 21a (fiber sheet F2), the fiber bundle F3 is cut at a predetermined position, and the winding of the fiber bundle F3 is completed. The cylinder member 21 (the cylinder body 21a and the peripheral edge portions 21b) is then cured and removed from the mandrel 200. The cylinder member forming step S2 is thus completed.

The structure of the high-pressure tank 10 and the method for manufacturing the high-pressure tank 10 according to the present embodiment are otherwise similar to the first embodiment.

In the present embodiment, as described above, the fiber bundle F3 is wound from one end to the other end of the cylinder body 21a (fiber sheet F2) so as to overlap the cylinder body 21a. The outer peripheral surface of the cylinder body 21a is thus held by the fiber bundle F3 along the entire length in the axial direction X of the cylinder body 21a. The end Fa of the winding of the fiber sheet F2 is thus reliably restrained from peeling off.

Other effects of the present embodiment are similar to those of the first embodiment.

Third Embodiment

A third embodiment will be described with respect to an example in which, unlike the first and second embodiments, the fiber bundle F3 is wound around two regions of the outer peripheral surface of the mandrel 200, namely a region adjacent to one end of the cylinder body 21a and a region adjacent to the other end of the cylinder body 21a, and the outer peripheral surface of the cylinder body 21a, in the cylinder member forming step S2.

Figure 11:
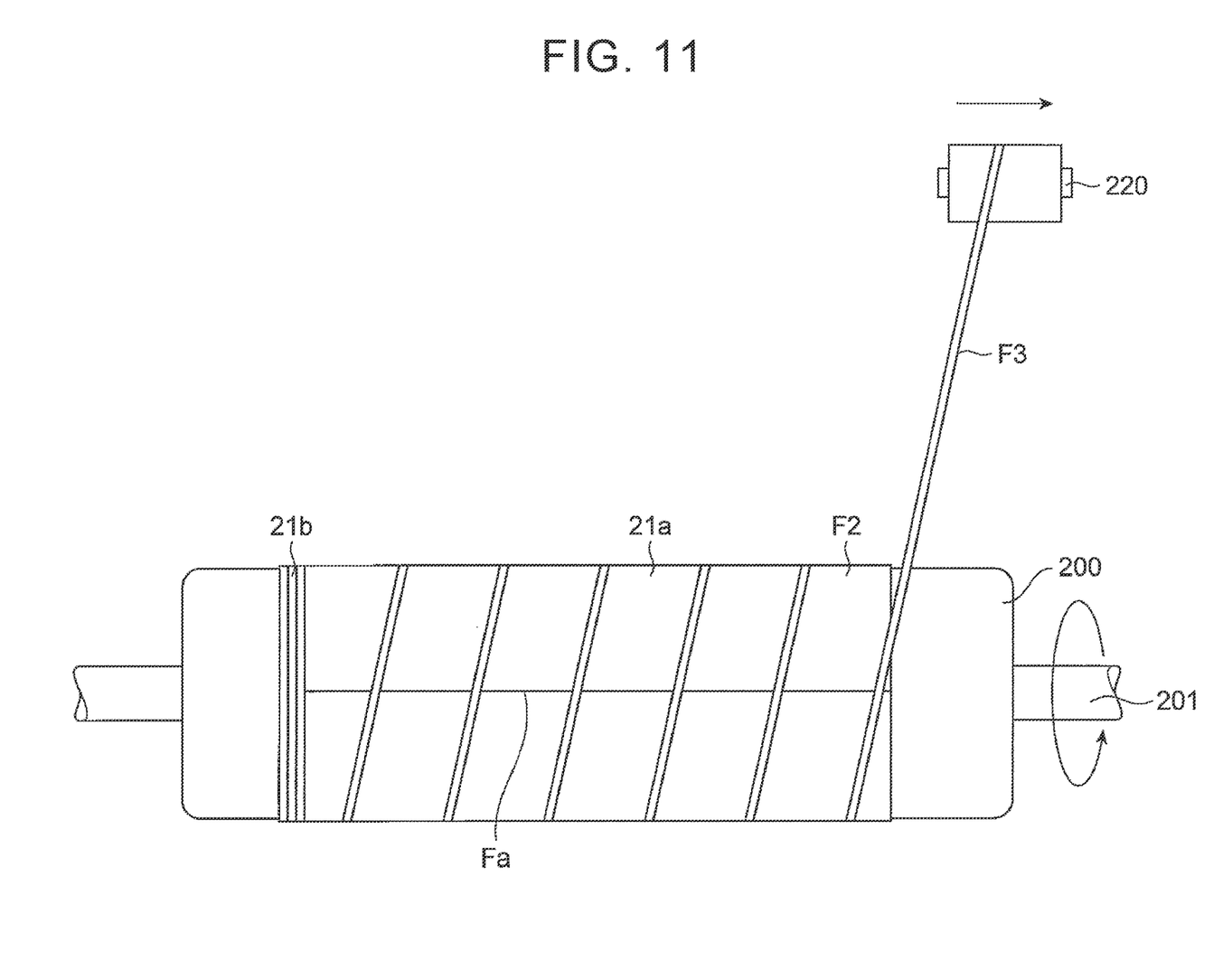
FIG. 11 illustrates a cylinder member forming step of a method for manufacturing a high-pressure tank according to a third embodiment of the disclosure.

In the third embodiment, as shown in FIG. 11, one feed roller 220 is disposed so as to face the outer peripheral surface of the mandrel 200.

In the cylinder member forming step S2, the fiber sheet F2 is first wound around a predetermined region of the mandrel 200 as in the first embodiment. The cylinder body 21a made of the fiber sheet F2 is thus formed.

Next, as shown in FIG. 11, the fiber bundle F3 is fed from the feed roller 220 while rotating the mandrel 200. The fiber bundle F3 is thus wound around the region of the outer peripheral surface of the mandrel 200 which is adjacent to the one end of the cylinder body 21a. The peripheral edge portion 21b on one side is thus formed. Since the feed roller 220 is moved in the axial direction, the fiber bundle F3 is wound so that the cylinder member 21 gradually becomes thinner as it extends away from the one end of the cylinder body 21a, as in the first embodiment.

When the winding of the fiber bundle F3 around the region on the one side of the cylinder body 21a is finished, the feed roller 220 is then moved toward the other side in the axial direction of the shaft 201 while feeding the fiber bundle F3. The fiber bundle F3 is thus wound around the outer peripheral surface of the cylinder body 21a (fiber sheet F2). As shown in FIG. 11, the fiber bundle F3 is wound at a predetermined pitch in the axial direction (such that the fiber sheet F2 is exposed).

The feed roller 220 is further moved toward the other side in the axial direction while feeding the fiber bundle F3. The fiber bundle F3 is thus wound around the region of the outer peripheral surface of the mandrel 200 which is adjacent to the other end of the cylinder body 21a. The peripheral edge portion 21b on the other side is thus formed. Since the feed roller 220 is moved in the axial direction, the fiber bundle F3 is wound so that the cylinder member 21 gradually becomes thinner as it extends away from the other end of the cylinder body 21a, as in the first embodiment.

Once the peripheral edge portion 21b is formed on the other side of the cylinder body 21a, the fiber bundle F3 is cut at a predetermined position, and the winding of the fiber bundle F3 around the mandrel 200 is completed. The cylinder member 21 (the cylinder body 21a and the peripheral edge portions 21b) is then cured and removed from the mandrel 200. The cylinder member forming step S2 is thus completed.

The structure of the high-pressure tank 10 and the method for manufacturing the high-pressure tank 10 according to the present embodiment are otherwise similar to the first embodiment. When forming the peripheral edge portions 21b, the fiber bundle F3 may be wound at least once around the edges of the cylinder body 21a so as to overlap the edges of the cylinder body 21a as in the first embodiment. The peripheral edge portions 21b may not overlap the edges of the cylinder body 21a.

As described above, in the present embodiment, the fiber bundle F3 is wound on the outer peripheral surface of the cylinder body 21a (fiber sheet F2) while being moved from the region on one side of the cylinder body 21a to the region on the other side of the cylinder body 21a. The outer peripheral surface of the cylinder body 21a is thus held by the fiber bundle F3 along the entire length in the axial direction X of the cylinder body 21a. The end Fa of the winding of the fiber sheet F2 is thus reliably restrained from peeling off. Moreover, since the fiber bundle F3 can be continuously wound from the region on one side of the cylinder body 21a to the region on the other side of the cylinder body 21a, the number of feed rollers 220 for supplying the fiber bundle F3 can be reduced as compared to the case where separate fiber bundles F3 are wound around the region on one side of the cylinder body 21a and the region on the other side of the cylinder body 21a.

In the example described in the present embodiment, the fiber bundle F3 is continuously wound around the region on one side of the cylinder body 21a, the outer peripheral surface of the cylinder body 21a, and the region on the other side of the cylinder body 21a. However, the fiber bundle F3 may be cut each time winding around each region is finished. In other words, winding around each region may be performed separately. Alternatively, winding around each region may be simultaneously performed using two or more unwinding rollers 220.

Other effects of the present embodiment are similar to those of the first embodiment.

The embodiments disclosed herein should be construed as illustrative in all respects, not restrictive. The scope of the disclosure is shown by the claims rather than by the description of the embodiments and includes all modifications that are made without departing from the spirit and scope of the claims.

For example, in the example described in the above embodiment, the liner is formed after forming the reinforcing body and the outer reinforcing layer. However, the disclosure is not limited to this. For example, when combining both ends of the cylinder member and the peripheral edge portions of the dome members in the joining step, the cylinder member and the dome members may be joined so as to cover a resin liner formed in advance. In this case, the liner forming step is not performed. Such a liner can be formed by a conventionally known manufacturing method. However, the liner need not have high strength because no fiber bundle is wound around the outer surface of the liner by the FW process. Accordingly, the thickness of the liner can be reduced as compared to conventional liners. The liner may be made of a metal material such as aluminum alloy instead of the resin material.

In the example described in the above embodiment, the reinforcing body is composed of three members (the cylinder member and the pair of dome members). However, the disclosure is not limited to this. For example, the reinforcing body may be composed of four or more members (two or more cylinder members and a pair of dome members). In this case, the two or more cylinder members may first be joined together to form a single cylinder member, and the dome members may then be joined to both ends of the cylinder member. Alternatively, the cylinder members may first be joined to the dome members, one to each dome member, and the resultant members may then be joined together.

In the example described in the above embodiment, the liner is formed after forming the outer reinforcing layer on the outer surface of the reinforcing body. However, the disclosure is not limited to this. The outer reinforcing layer may be formed on the outer surface of the reinforcing body after forming the linear inside the reinforcing body. In this case, the liner is preferably formed using a thermosetting resin such as epoxy resin so that the liner will not be softened during curing of the outer reinforcing layer.

In the example described in the above embodiment, the peripheral edge portions are formed so as have a tilted outer surface (or stepped outer surface). However, the outer surfaces of the peripheral edge portions may be other than the tilted (or stepped) outer surfaces.

What is claimed is:

1. A method for manufacturing a high-pressure tank including a liner configured to store gas and a reinforcing layer made of a fiber-reinforced resin and covering an outer surface of the liner, comprising:
   forming a cylinder member made of the fiber-reinforced resin;
   forming a pair of dome members made of the fiber-reinforced resin; and
   forming a reinforcing body that is the reinforcing layer by joining peripheral edge portions of the cylinder member and peripheral edge portions of the dome members, wherein
   when forming the cylinder member, a resin-impregnated fiber sheet is wound around an outer peripheral surface of a mandrel to form a cylinder body, and a resin-impregnated fiber bundle is then wound so as to overlap the cylinder body.

2. The method according to claim 1, wherein
when forming the cylinder member, after the cylinder body is formed, the peripheral edge portions that overlap ends in an axial direction of the cylinder body are formed by winding the fiber bundle around the outer peripheral surface of the mandrel in such a manner that the fiber bundle adjoins the both ends of the cylinder body.

3. The method according to claim 2, wherein
when winding the fiber bundle in such a manner that the fiber bundle adjoins the both ends in the axial direction of the cylinder body, the fiber bundle is wound in such a manner that the cylinder member gradually becomes thinner as the cylinder member extends away from the ends of the cylinder body, and
when joining the cylinder member and the dome members, the peripheral edge portions of the cylinder member are inserted and fitted in the peripheral edge portions of the dome members, or the peripheral edge portions of the dome members are inserted and fitted in the peripheral edge portions of the cylinder member.

4. The method according to claim 1, wherein
when forming the cylinder member, after the cylinder body is formed, the fiber bundle is wound from one end of the cylinder body to the other end of the cylinder body so as to overlap the cylinder body.

5. The method according to claim 1, wherein
when forming the cylinder member, after the cylinder body is formed, the peripheral edge portion on one side is formed by winding the fiber bundle around the outer peripheral surface of the mandrel in such a manner that the fiber bundle adjoins one end of the cylinder body, the fiber bundle is wound from the one end to the other end of the cylinder body so as to overlap the cylinder body, and the peripheral edge portion on the other side is formed by winding the fiber bundle around the outer peripheral surface of the mandrel in such a manner that the fiber bundle adjoins the other end of the cylinder body.

* * * * *